United States Patent
Bainer et al.

(10) Patent No.: US 10,482,159 B2
(45) Date of Patent: Nov. 19, 2019

(54) ANIMATED PRESENTATION CREATOR

(71) Applicant: INTERNATIONAL BUSINESS MACHINES CORPORATION, Armonk, NY (US)

(72) Inventors: Nicolas Bainer, Buenos Aires (AR); Dario Alejando Falasca, Buenos Aires (AR); Federico Tomas Gimenez Molinelli, Buenos Aires (AR); Nicolas O. Nappe, Buenos Aires (AR); Gaston Alejo Rius, Buenos Aires (AR); Nicolas Tcherechansky, Buenos Aires (AR); Facundo J. Tomaselli, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 15/801,388

(22) Filed: Nov. 2, 2017

(65) Prior Publication Data
US 2019/0129920 A1    May 2, 2019

(51) Int. Cl.
*G10L 13/00*    (2006.01)
*G06F 17/21*    (2006.01)
(Continued)

(52) U.S. Cl.
CPC ............ *G06F 17/21* (2013.01); *G06F 16/345* (2019.01); *G06F 17/2785* (2013.01);
(Continued)

(58) Field of Classification Search
CPC ......... G06F 16/40; G10L 13/02; G10L 13/08; G10L 15/18
See application file for complete search history.

(56) References Cited

U.S. PATENT DOCUMENTS 6,751,776 B1    6/2004 Gong
7,827,034 B1    11/2010 Munns
(Continued)

FOREIGN PATENT DOCUMENTS

FR          2839168 A1    3/2006
WO    WO2014091479 A1    6/2014

OTHER PUBLICATIONS

Peter Mell et al, The NIST Definition of Cloud Computing, National Institute of Standards and Technology, Publication 800-145, 2011, entire document.

(Continued)

*Primary Examiner* — Daniel Abebe
(74) *Attorney, Agent, or Firm* — Patrick J. Daugherty; Daugherty & Del Zoppo Co., LPA

(57) ABSTRACT

Aspects create a multimedia presentation wherein processors are configured to calculate a time it would take to narrate a plurality of words in a document at a specified speech speed in response to determining that the time it would take to narrate the plurality of words in the document at the specified speech speed exceeds a specified maximum time, generate a long summary of the document as a subset of the plurality of words, generate audio content for a first portion of the plurality of words of the long summary by applying a text-to-speech processing mechanism to the portion of the long summary at the desired speech speed, and create a multimedia slide of a multimedia presentation by adding the generated audio content to a presentation of text from a remainder portion of the plurality of words of the long summary.

17 Claims, 5 Drawing Sheets

(51) Int. Cl.
  *G06F 17/28* (2006.01)
  *G10L 13/04* (2013.01)
  *G10L 13/027* (2013.01)
  *G06F 16/34* (2019.01)
  *G06F 17/27* (2006.01)
  *H04N 21/8543* (2011.01)
  *G11B 27/031* (2006.01)
  *H04N 21/81* (2011.01)

(52) U.S. Cl.
  CPC ............ *G06F 17/28* (2013.01); *G10L 13/027* (2013.01); *G10L 13/043* (2013.01); *G11B 27/031* (2013.01); *H04N 21/812* (2013.01); *H04N 21/8543* (2013.01)

(56) References Cited

U.S. PATENT DOCUMENTS

| | | | |
|---|---|---|---|
| 8,996,376 | B2 | 3/2015 | Fleizach et al. |
| 2005/0055212 | A1* | 3/2005 | Nagao .................... G10L 13/00 704/270.1 |
| 2008/0313130 | A1 | 12/2008 | Hammond et al. |
| 2009/0204243 | A1 | 8/2009 | Marwaha et al. |
| 2009/0254345 | A1* | 10/2009 | Fleizach .............. G10L 13/043 704/260 |
| 2015/0261773 | A1 | 9/2015 | Walid et al. |
| 2015/0269153 | A1* | 9/2015 | Fink .................. G06F 16/24578 707/750 |
| 2018/0004844 | A1* | 1/2018 | Ghanekar ............ G06F 16/345 |
| 2018/0218726 | A1* | 8/2018 | Arumugam ............. G09B 5/04 |

OTHER PUBLICATIONS

Tulasi Prasad Sariki et al, Effective Classroom Presentation Generation Using Text Summarization, IJCTA, ISSN: 2229-6093, 2014, pp. 1527-1531.

Paul Piwek et al, Generating Multimedia Presentations from Plain Text to Screen Play, O. Stock and M. Zancanara (Eds.), Intelligent Multimodal Information Presentation, Text, Speech and Language Processing, vol. 27. Dordrecht: Springer, 2005, entire document.

* cited by examiner

ANIMATED PRESENTATION CREATOR

BACKGROUND

An automated presentation creator is an application ("app") that is executed on a computerized device processor that automatically analyzes an input document to provide a summary of the input document in the form of a presentation. Generally, the summary, and therefore the presentation, is much shorter than the input document. Due to the size and conciseness of the presentation, a user can save time viewing the presentation rather than reading the entire input document.

SUMMARY

In one aspect of the present invention, a computerized method for creating a multimedia presentation includes executing steps on a computer processor. Thus, a computer processor is configured to calculate a time it would take to narrate a plurality of words in a document at a specified speech speed and in response to determining that the time it would take to narrate the plurality of words in the document at the specified speech speed exceeds a specified maximum time, generate a long summary of the document as subset of the plurality of words that comprises highest relevant information identified by applying natural language processing to the document, and that require a time to narrate at the specified speech speed that is less than the specified maximum time. The computer processor is further configured to generate audio content for a first portion of the plurality of words of the long summary by applying a text-to-speech processing mechanism to the portion of the long summary at the desired speech speed and create a multimedia slide of a multimedia presentation by adding the generated audio content to a presentation of text from a remainder portion of the plurality of words of the long summary.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to calculate a time it would take to narrate a plurality of words in a document at a specified speech speed and in response to determining that the time it would take to narrate the plurality of words in the document at the specified speech speed exceeds a specified maximum time, generates a long summary of the document as subset of the plurality of words that comprises the highest relevant information identified by applying natural language processing to the document, and that requires a time to narrate at the specified speech speed that is less than the specified maximum time. The computer processor is further configured to generate audio content for a first portion of the plurality of words of the long summary by applying a text-to-speech processing mechanism to the portion of the long summary at the desired speech speed and create a multimedia slide of a multimedia presentation by adding the generated audio content to a presentation of text from a remainder portion of the plurality of words of the long summary.

In another aspect, a computer program product for scheduling an event has a computer-readable storage medium with computer readable program code embodied therewith. The computer readable hardware medium is not a transitory signal per se. The computer readable program code includes instructions for execution which cause the processor to calculate a time it would take to narrate a plurality of words in a document at a specified speech speed and in response to determining that the time it would take to narrate the plurality of words in the document at the specified speech speed exceeds a specified maximum time, generates a long summary of the document as subset of the plurality of words that comprises the highest relevant information identified by applying natural language processing to the document, and that requires a time to narrate at the specified speech speed that is less than the specified maximum time. The computer readable program code further includes instructions for execution which cause the processor to generate audio content for a first portion of the plurality of words of the long summary by applying a text-to-speech processing mechanism to the portion of the long summary at the desired speech speed and create a multimedia slide of a multimedia presentation by adding the generated audio content to a presentation of text from a remainder portion of the plurality of words of the long summary.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
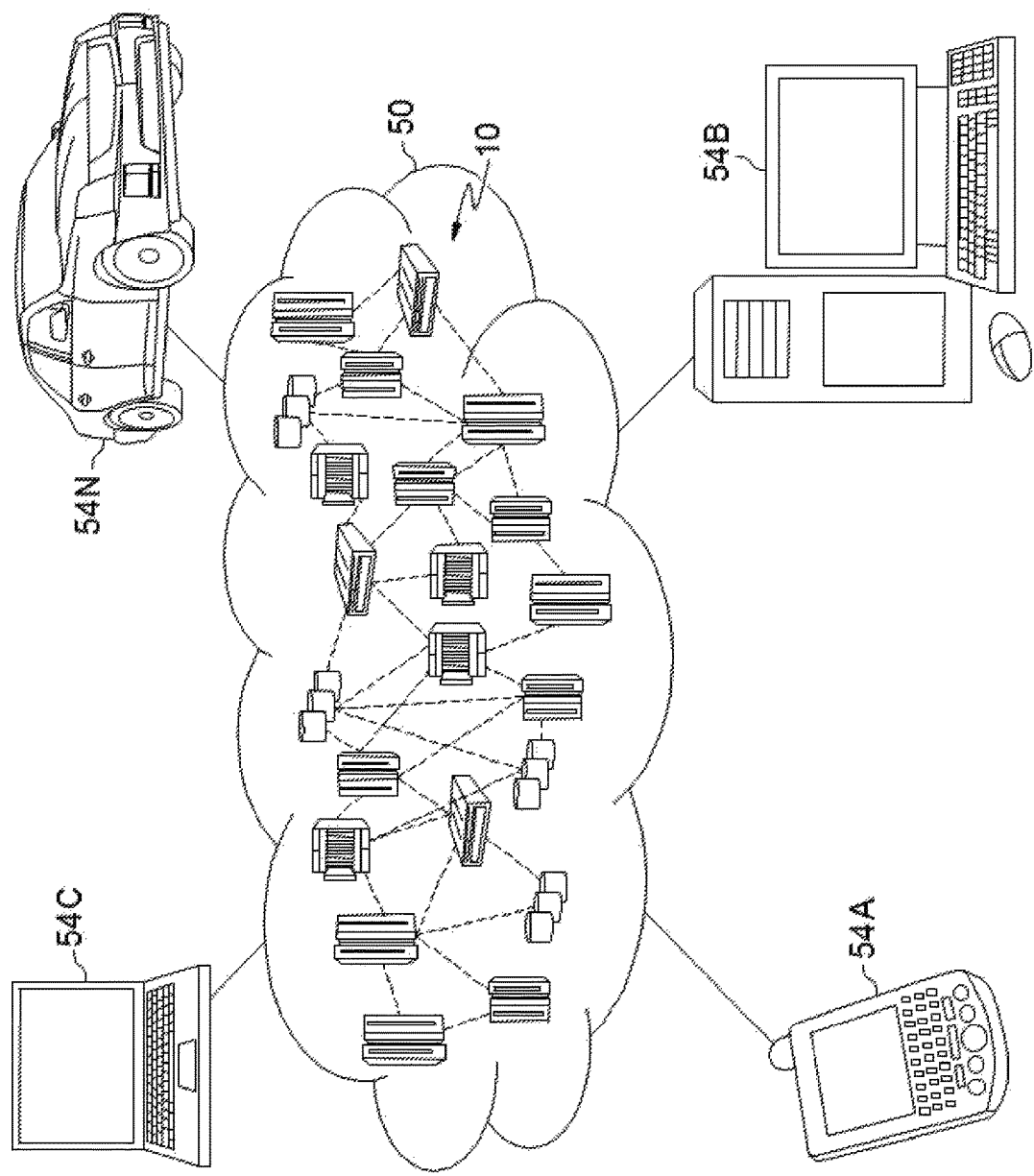
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
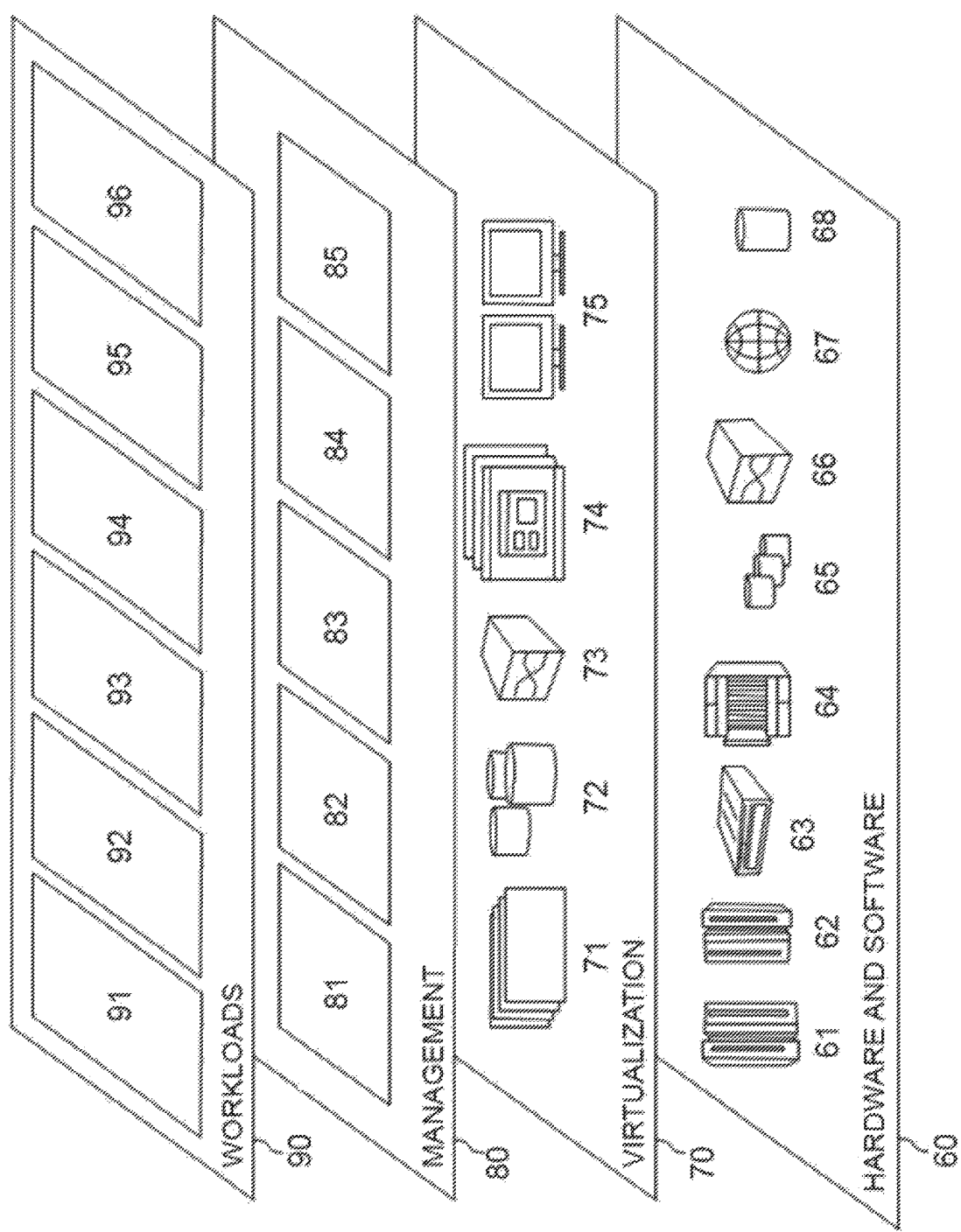
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for scheduling an event 96.

Figure 3:
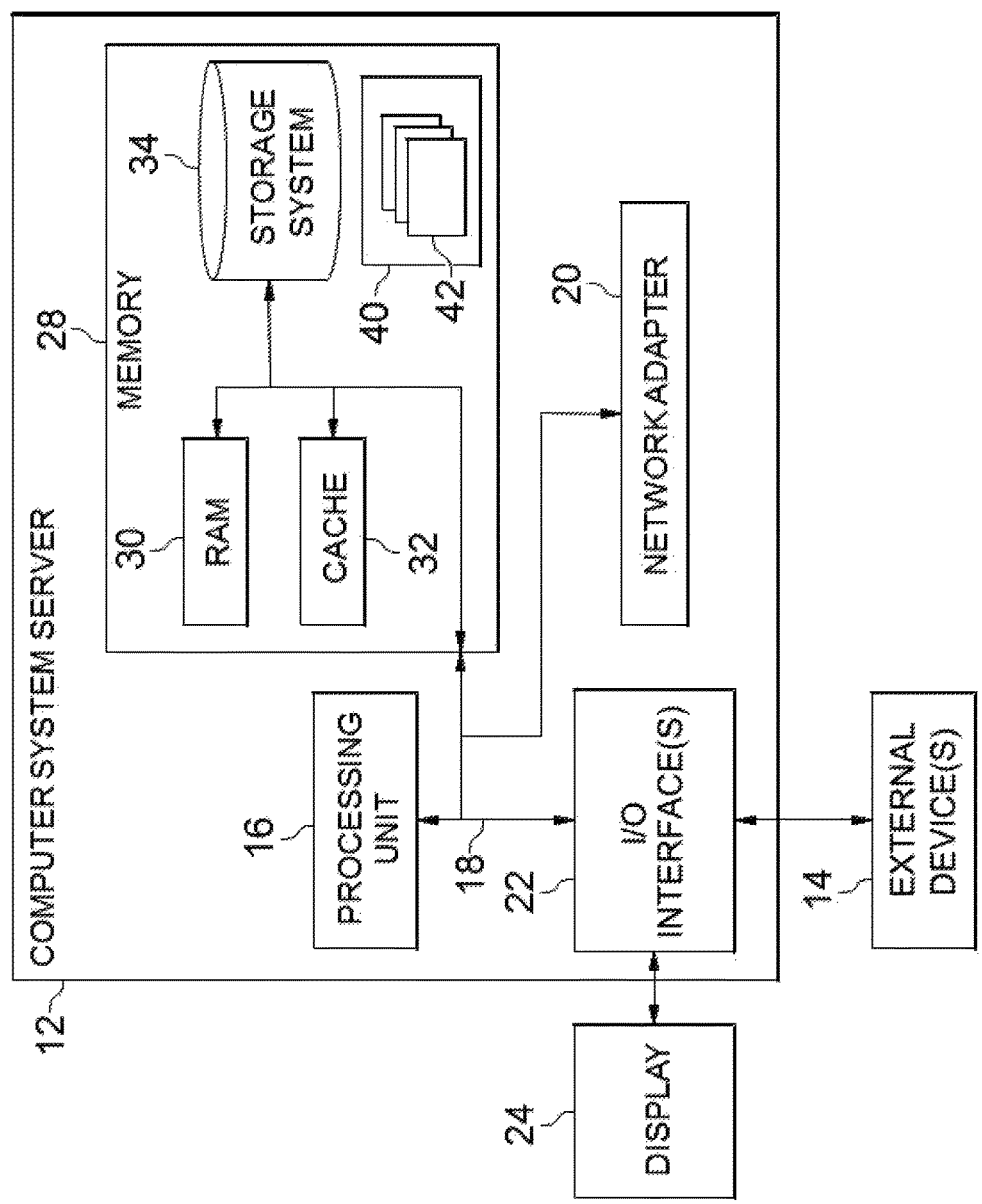
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
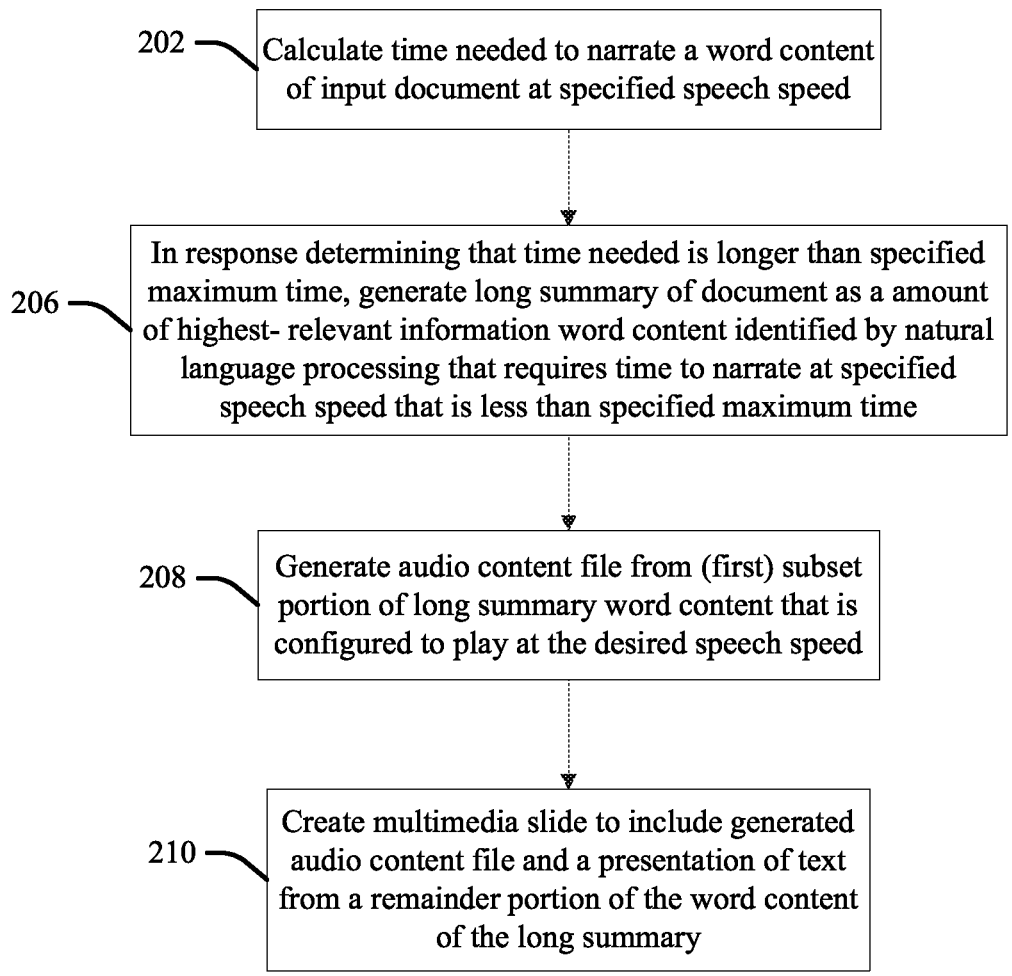
FIG. 4 is a flow chart illustration of an embodiment of the present invention.

FIG. 4 illustrates a process or system according to the present invention for creating a presentation based on a document. At 202 a processor that is configured according to an aspect of the present invention (the "configured processor") calculates the time needed to narrate a plurality of words in an input document at a specified speech speed. The input document may be in any file format, so long as text can be extracted from the input document: (illustrative but not limiting or exhaustive examples include a Portable Document Format (PDF), Word document or Hypertext Markup Language (HTML)). For example, if there are 1,500 words in the input document and the desired speech speed is 150 words per minute, the configured processor calculates the time needed to narrate the document as 10 minutes.

At 206, in response to determining that the time it would take to narrate the input document at the desired speech speed is longer than a specified maximum time, the configured processor generates a long summary of the input document as a portion (subset) of a plurality of words that comprises highest relevant information identified by applying natural language processing to the document, and that requires a time to narrate at the specified speech speed that is less than the specified maximum time. The configured processor generates the long summary by applying a natural language processing mechanism (NLP) to the input document. The NLP selects the text most relevant to the long summary by identifying words or phrases which include entities, people, companies, organizations, cities, geographic features and other entities from the plain text representation, by optionally identifying the location of the words or phrases and by optionally detecting the sentiment of each entity within the plain text representation and assigning a score (for example between 0 and 1) to each keyword or phrase. The most relevant words or phrases are the words or phrases which exceed a long summary score threshold. The NLP also selects the most relevant text that when narrated at the desired speech speed is less than the maximum specified time. For example, if the configured processor determines sentences A, D, and F are the most relevant sentences of an input document containing sentences A, B, C, D, E, and F and determines that the time needed to narrate A, D, and F is shorter than the specified maximum time at the desired speech speed, then sentences A, D, and F are added to the long summary.

At 208, the configured processor generates an audio content file from a (first) subset portion of the long summary word content (illustrative but not limiting or exhaustive examples include WAV, MP3, and AIFF file formats) by applying a text-to-speech process to the text of the long summary, wherein the audio content file is configured to play at the desired speech speed. For example, if the long summary includes the sentences A, B, and C and the desired speech speed is 150 words per minute, then the configured processor creates an audio file for sentences A, B, and C where sentences A, B, and C are played at 150 words per minute.

At 210, the configured processor creates a multimedia slide of a multimedia presentation by adding the generated audio content file of the long summary and a presentation of text from a remainder portion of the word content of the long summary to the multimedia slide.

Figure 5:
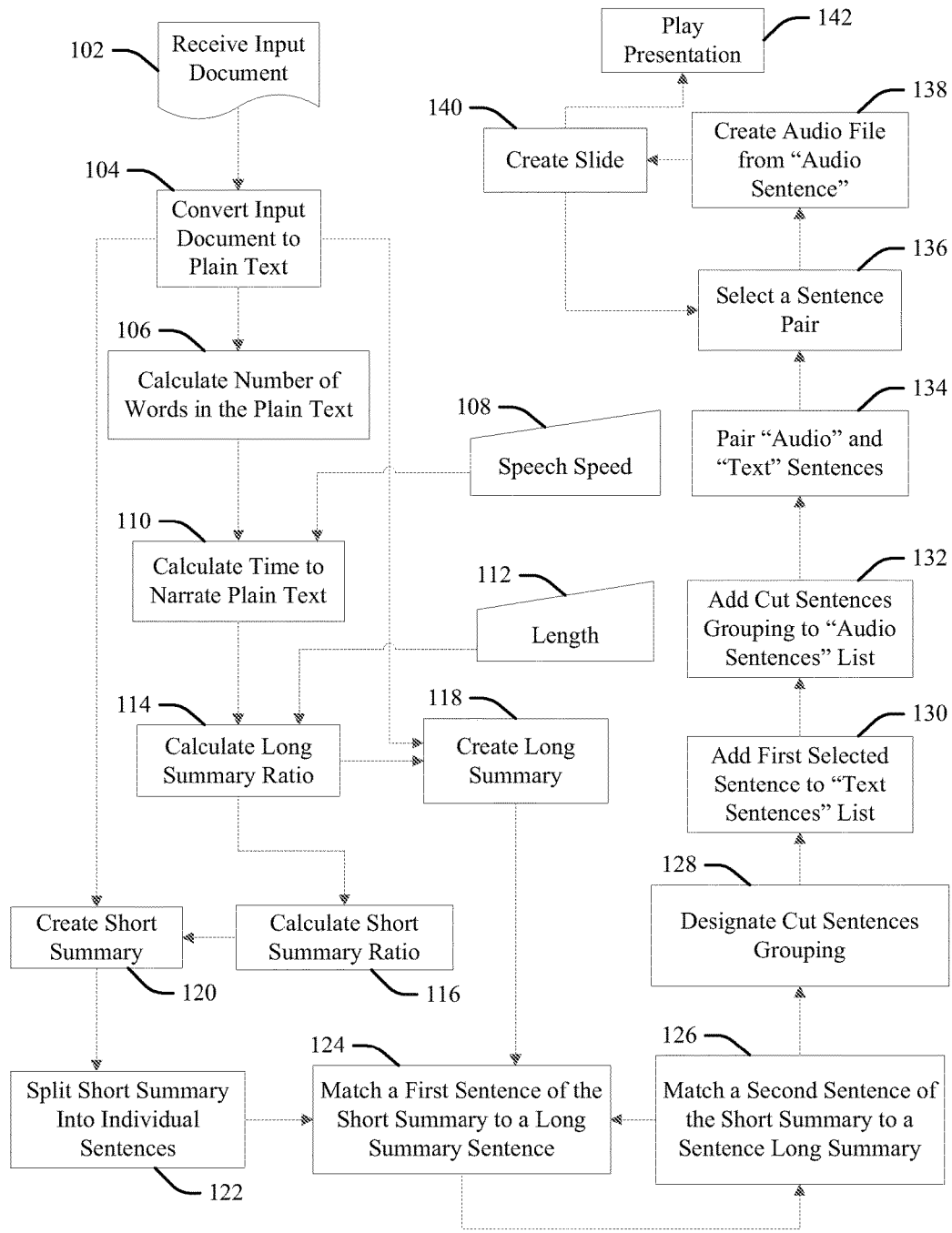
FIG. 5 is a flow chart illustration of an embodiment of the present invention.

FIG. 5 illustrates a process or system according to the present invention for creating a presentation based on a document. At 102 a processor that is configured according to an aspect of the present invention (the "configured processor") receives an input document. The input document may be in any file format, so long as text can be extracted from the input document (illustrative but not limiting or exhaustive examples include a Portable Document Format (PDF), Word document or Hypertext Markup Language (HTML)).

At 104, the configured processor converts the input document to a plain text format representation of the document via a document conversion application programming interface (API) or other mechanism.

At 106, the configured processor calculates the total number of words in the plain text representation.

At 108, the configured processor determines or identifies a specified, desired speech speed (for example, 150 words per minute, 300 words per minute, 75 words per minute).

At 110, the configured processor calculates the time it would take to narrate the calculated number of words in the plain text representation at the desired speech speed. In one example, the configured processor calculates the time it would take to narrate a 1,500 word plain text with a desired speech speed of 150 words per minute as 10 minutes. In another example, the configured processor calculates the time it would take to narrate a 4,500 word plaint text document with a desired speech speed of 300 words per minute as 15 minutes. In yet another example, the configured processor calculates the time it would take to narrate a 6,000 word plaint text document with a desired speech speed of 75 words per minute as 80 minutes.

At 112, the configured processor determines or identifies a specified, desired presentation length (for example, 15 minutes, 30 minutes, 60 minutes). The desired presentation length is a user desired length of a presentation, or some other standard or requirement.

At 114, the configured processor calculates a long summary ratio as the quotient of the desired presentation length divided by the calculated time needed to narrate the plain text (for example, if the configured processor receives an input of 30 minutes as a desired presentation length and calculates the time to narrate the plain text as 60 minutes, then the long summary ratio is 0.5).

At 116, the configured processor determines a short summary ratio as a fractional value of the long summary ratio. In some aspects, the short summary ratio is determined to be 50% or half the long summary ratio (for example, if the long summary ratio is 0.5, then the short summary ratio is 0.25), though other fractional values may be practiced as will be appreciated by one skilled in the art.

At 118, the configured processor creates a long summary of the plain text representation based on the long summary ratio. Aspects generate the long summary by applying a natural language processing (NLP) mechanism, system or process to create a long summary of the plain text representation as the long summary ratio amount of the text content that is determined to be most relevant to the document. The NLP selects the text most relevant to the long summary by identifying words or phrases which include entities, people, companies, organizations, cities, geographic features and other entities from the plain text representation, by optionally identifying the location of the words or phrases within the document and by optionally detecting the sentiment of each entity within the plain text representation and assigning a score (for example between 0 and 1) to each keyword or phrase. The most relevant words or phrases are the words or phrases which exceed a long summary score threshold. For example, if the long summary ratio is 0.5 and the long summary score threshold is 0.5, then the aspect will select half the text of the plain text which has been scored as 0.5 or above by the NLP.

At 120, the configured processor creates a short summary of the plain text representation based on the short summary ratio. Aspects generate the short summary by applying the NLP mechanism, system or process to create the short summary of the plain text representation as the short summary ratio amount of the text content that is determined to be most relevant to the document. The NLP selects the text most relevant to the short summary by identifying words or phrases which include entities, people, companies, organizations, cities, geographic features and other entities from the plain text representation and optionally detects the sentiment of each entity within the plain text representation and assigns a score (for example between 0 and 1) to each keyword or phrase. The most relevant words or phrases are the words or phrases which exceed a short summary score threshold, which is higher than the long summary score threshold, and therefore encompasses less text (for example, if the long summary threshold is 0.5 then the short summary threshold may be 0.75). In one instance where the long summary ratio is 0.25 and the short summary score threshold is 0.75, then the aspect will select a quarter of the text of the plain text which has been scored as 0.75 or above by the NLP.

At 122, the configured processor splits the short summary into individual sentences and orders the sentences in a list. For example, if the short summary includes sentences A, B, and C, the configured processor may order the sentences as 1. A, 2. B, and 3. C.

At 124, the configured processor selects a first sentence of the list and searches the long summary for the same sentence. If the configured processor matches the first selected sentence of the list to a sentence in the long summary, then the configured processor determines the position of a first matched sentence within the long summary. For example, the configured processor selects sentence A from the list of sentences. The configured processor then searches the long summary, which contains, in its entirety, sentences A, B, C, and D in that order. After determining that the selected sentence A of the list of sentences matches sentence A of the long summary, the configured processor determines that sentence A is the first sentence in the long summary.

At 126, the configured processor selects a second sentence of the list and searches the long summary for the same sentence. If the configured processor matches the second selected sentence of the list to a sentence in the long summary, then the configured processor determines the position of the second matched sentence within the long summary. For example, the configured processor selects sentence C from the list of sentences. The configured processor then searches the long summary, which contains in its entirety sentences A, B, C, and D in that order. After determining that the selected sentence C of the list of sentences matches sentence C of the long summary, the configured processor determines that sentence C is the third sentence in the long summary.

At 128, the configured processor designates a portion of the text of the long summary that is located between the first matched sentence and the second matched sentence as a cut sentence grouping of the long summary. For example, if the configured processor determines sentence A is the first matched sentence of a long summary and determines that sentence D is the second matched sentence of a long summary which contains, in its entirety, sentences A, B, C, D, E, and F in that order, then the configured processor designates the portion of the long summary between sentences A and D as the cut sentence grouping. As such, the configured processor designates sentences B and C as the cut sentences grouping of the long summary.

At 130, the configured processor adds the first selected sentence to a list called "text sentences."

At 132, the configured processor adds the cut sentence grouping to a list called "audio sentences."

At 134, the configured processor pairs the sentences in the "audio" and "text" sentences list based on the order in which they were received. For instance, if sentence A is the first sentence added to the text sentences list and sentences B and C are the first cut sentence grouping added to the audio sentences list, then sentence A is paired with sentences B and C.

At 136, the configured processor selects a pair of sentences.

At 138, the configured processor generates an audio content file from the plain text format content of the "audio sentences" of the selected pair via application of a text-to-speech processing mechanism, thereby creating an audio file based on the text content of the text selection/grouping (illustrative but not limiting or exhaustive examples include WAV, MP3, and AIFF file formats). For example, if the selected pair of sentences includes the text sentence A and the audio sentences B and C, then the configured processor applies a text-to-speech process to sentences B and C to create an audio file for sentences B and C.

At 140, the configured processor creates and adds a multimedia slide to a presentation, the multimedia slide comprising the audio file and the "text" sentence of the pair of "text" and "audio" sentences. For instance, if the pair includes the text sentence A and the audio file corresponding to sentences B and C, then text sentence A and the audio file for sentences B and C are added to a multimedia slide of a presentation. The presentation may be any HTML format (illustrative but not limiting or exhaustive examples include Power Point, Keynote, Prezi).

At 142, the configured processor plays the presentation once all of the sentence pairs have been added to the presentation based on the input speech speed and the input presentation length.

Thus, aspects of the present invention use analytics on a document to create a summary of the document. The analytics summarize the content of the document using a cognitive approach. In this manner, relevant content of the document is presented in a user-friendly manner via a presentation. Doing so saves the user the time of reading the entire document.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a presentation based on a text document, comprising executing on a computer processor:

calculating a time it would take to narrate a plurality of words in a document at a specified speech speed;

in response to determining that the calculated time it would take to narrate the plurality of words in the document at the specified speech speed exceeds a specified maximum time, generating a long summary of the document as a subset of the plurality of words that comprises highest relevant information identified by applying natural language processing to the document, and that requires a time to narrate at the specified speech speed that is less than the specified maximum time;

calculating a long summary ratio by dividing the specified maximum time by the calculated time it would take to narrate the number of words in the document at the desired speech speed;

selecting a first portion of the plurality of words of the long summary to comprise an amount of text content that is the calculated long summary ratio percentage of text content defined by the plurality of words in the document;

generating audio content for the first portion of the plurality of words of the long summary by applying a text-to-speech processing mechanism to the portion of the long summary at the desired speech speed; and creating a multimedia slide of a multimedia presentation by adding the generated audio content to a presentation of text from a remainder portion of the plurality of words of the long summary.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the calculating the time it would take to narrate the plurality of words in a document at the specified speech speed, generating the long summary of the document in response to determining that the time it would take to narrate the plurality of words in the document at the specified speech speed exceeds the specified maximum time, the calculating the long summary ratio, the selecting the first portion of the plurality of words of the long summary, the generating the audio content for the first portion of the plurality of words of the long summary, and the creating the multimedia slide of the multimedia presentation.

3. The method of claim 2, wherein the computer-readable program code is provided as a service in a cloud environment.

4. The method of claim 1, wherein the natural language processing generates relevance scores for text content of the document, the method further comprising:

generating the long summary by selecting text content having relevance scores above a long summary threshold.

5. The method of claim 4, further comprising:

calculating a short summary ratio as a fractional amount of the long summary ratio;

generating a short summary by applying the natural language processing to select a second portion of the document comprising a short summary ratio amount of the plurality of words of the document that have the highest relevance scores;

matching a first sentence of the short summary to a first sentence of the long summary;

matching a second sentence of the short summary to a second sentence of the long summary;

designating the first portion of the plurality of words of the long summary as words of the long summary located between the first sentence and the second sentence;

generating the audio content by applying the text-to-speech processing mechanism to the first portion; and creating the multimedia slide by adding the first sentence of the short summary and the audio content to the multimedia slide.

6. The method of claim 5, further comprising, generating the short summary by selecting scored text having relevance scores above a short summary threshold.

7. The method of claim 4, further comprising:

selecting the short summary ratio to be half the long summary ratio.

8. The method of claim 5, further comprising:

using the natural language processing to score the text content of the document based on the location of phrases within the document.

9. A system comprising:

a processor;

a computer readable memory in circuit communication with the processor; and a computer readable storage medium in circuit communication with the processor;

wherein the processor executes program instructions stored on the computer-readable storage medium via the computer readable memory and thereby:

calculates a time it would take to narrate a plurality of words in a document at a specified speech speed;

in response to determining that the calculated time it would take to narrate the plurality of words in the document at the specified speech speed exceeds a specified maximum time, generates a long summary of the document as a subset of the plurality of words that comprises highest relevant information identified by applying natural language processing to the document, and that requires a time to narrate at the specified speech speed that is less than the specified maximum time;

calculates a long summary ratio by dividing the specified maximum time by the calculated time it would take to narrate the number of words in the document at the desired speech speed;

selects a first portion of the plurality of words of the long summary to comprise an amount of text content that is the calculated long summary ratio percentage of text content defined by the plurality of words in the document;

generates audio content for the first portion of the plurality of words of the long summary by applying a text-to-speech processing mechanism to the portion of the long summary at the desired speech speed; and creates a multimedia slide of a multimedia presentation by adding the generated audio content to a presentation of text from a remainder portion of the plurality of words of the long summary.

10. The system of claim 9, wherein the natural language processing generates relevance scores for text content of the document and wherein the processor executes the program instructions stored on the computer-readable storage medium via the computer readable memory and thereby:

generates the long summary by selecting text content having relevance scores above a long summary threshold.

11. The system of claim 10, wherein the processor executes the program instructions stored on the computer-readable storage medium via the computer readable memory and thereby:
- calculates a short summary ratio as a fractional amount of the long summary ratio;
- generates a short summary by applying the natural language processing to select a second portion of the document comprising a short summary ratio amount of the plurality of words of the document that have the highest relevance scores;
- matches a first sentence of the short summary to a first sentence of the long summary;
- matches a second sentence of the short summary to a second sentence of the long summary;
- designates the first portion of the plurality of words of the long summary as words of the long summary located between the first sentence and the second sentence;
- generates the audio content by applying the text-to-speech processing mechanism to the first portion; and
- creates the multimedia slide by adding the first sentence of the short summary and the audio content to the multimedia slide.

12. The system of claim 11, wherein the processor executes the program instructions stored on the computer-readable storage medium via the computer readable memory and thereby:
- generates the short summary by selecting scored text having relevance scores above a short summary threshold.

13. The system of claim 11, wherein the processor executes the program instructions stored on the computer-readable storage medium via the computer readable memory and thereby:
- uses the natural language processing to score the text content of the document based on the location of phrases within the document.

14. A computer program product for scheduling an event, the computer program product comprising:
- a computer readable storage medium having computer readable program code embodied therewith, wherein the computer readable storage medium is not a transitory signal per se, the computer readable program code comprising instructions for execution by a processor that cause the processor to:
- calculate a time it would take to narrate a plurality of words in a document at a specified speech speed;
- in response to determining that the calculated time it would take to narrate the plurality of words in the document at the specified speech speed exceeds a specified maximum time, generate a long summary of the document as a subset of the plurality of words that comprises the highest relevant information identified by applying natural language processing to the document, and that requires a time to narrate at the specified speech speed that is less than the specified maximum time;
- calculate a long summary ratio by dividing the specified maximum time by the calculated time it would take to narrate the number of words in the document at the desired speech speed;
- select a first portion of the plurality of words of the long summary to comprise an amount of text content that is the calculated long summary ratio percentage of text content defined by the plurality of words in the document;
- generate audio content for the first portion of the plurality of words of the long summary by applying a text-to-speech processing mechanism to the portion of the long summary at the desired speech speed; and
- create a multimedia slide of a multimedia presentation by adding the generated audio content to a presentation of text from a remainder portion of the plurality of words of the long summary.

15. The computer program product of claim 14, wherein the natural language processing generates relevance scores for text content of the document and wherein the computer readable program code instructions for execution by the processor further cause the processor to:
- generate the long summary by selecting text content having relevance scores above a long summary threshold.

16. The computer program product of claim 15, wherein the computer readable program code instructions for execution by the processor further cause the processor to:
- calculate a short summary ratio as a fractional amount of the long summary ratio;
- generate a short summary by applying the natural language processing to select a second portion of the document comprising a short summary ratio amount of the plurality of words of the document that have the highest relevance scores;
- match a first sentence of the short summary to a first sentence of the long summary;
- match a second sentence of the short summary to a second sentence of the long summary;
- designate the first portion of the plurality of words of the long summary as words of the long summary located between the first sentence and the second sentence;
- generate the audio content by applying the text-to-speech processing mechanism to the first portion; and
- create the multimedia slide by adding the first sentence of the short summary and the audio content to the multimedia slide.

17. The computer program product of claim 16, wherein the computer readable program code instructions for execution by the processor further cause the processor to:
- generate the short summary by selecting scored text having relevance scores above a short summary threshold.

* * * * *